(12) United States Patent
Tiana et al.

(10) Patent No.: US 11,530,918 B2
(45) Date of Patent: *Dec. 20, 2022

(54) INTEGRITY MONITORING SYSTEMS AND METHODS FOR IMAGE SENSORS

(71) Applicant: Rockwell Collins, Inc., Cedar Rapids, IA (US)

(72) Inventors: Carlo L. Tiana, Portland, OR (US); Robert D. Brown, Lake Oswego, OR (US); Weston J. Lahr, Sherwood, OR (US); Daniel Chiew, Portland, OR (US); Elisabeth Barnes, Portland, OR (US); Yashaswi M. Narasimha Murthy, Tigard, OR (US); Brandon E. Wilson, Portland, OR (US); Robert W. Wood, Beaverton, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/164,441

(22) Filed: Feb. 1, 2021

(65) Prior Publication Data
US 2021/0156689 A1 May 27, 2021

Related U.S. Application Data

(62) Division of application No. 15/882,885, filed on Jan. 29, 2018, now Pat. No. 10,907,968.

(51) Int. Cl.
*H04N 7/18* (2006.01)
*G01C 21/00* (2006.01)
(Continued)

(52) U.S. Cl.
CPC ....... *G01C 21/005* (2013.01); *H04N 5/23254* (2013.01); *H04N 5/23258* (2013.01);
(Continued)

(58) Field of Classification Search
CPC ............ G01C 21/005; H04N 5/23254; H04N 5/23258; H04N 5/33; H04N 5/367; H04N 17/002; H04N 7/00; H04N 7/18
(Continued)

(56) References Cited

U.S. PATENT DOCUMENTS 6,047,082 A 4/2000 Rhody et al.
7,489,334 B1* 2/2009 Pickering ................. H04N 7/18
382/133
(Continued)

*Primary Examiner* — Trang U Tran
(74) *Attorney, Agent, or Firm* — Suiter Swantz pc llo

(57) ABSTRACT

An integrity monitoring system for a first image sensor includes an electronic processor configured to receive sensor data for the provision of image data associated with an environment of the avionic sensor. The electronic processor is configured to monitor the avionic sensor for integrity. The electronic processor is configured to perform at least one of: determining a presence of an optical feature associated with optics of the first image sensor, comparing overlap information derived from the sensor data and other sensor data, comparing characteristics of a digital output stream of the sensor data to expected characteristics, or comparing a first motion derived from the image data and a second motion derived from avionic position equipment.

13 Claims, 8 Drawing Sheets

(51) Int. Cl.
  *H04N 17/00*  (2006.01)
  *H04N 5/33*  (2006.01)
  *H04N 5/232*  (2006.01)
  *H04N 5/367*  (2011.01)

(52) U.S. Cl.
  CPC .............. *H04N 5/33* (2013.01); *H04N 5/367* (2013.01); *H04N 17/002* (2013.01)

(58) Field of Classification Search
  USPC ...... 702/104; 348/180, 181, 203.1, 143, 148
  See application file for complete search history.

(56) References Cited

U.S. PATENT DOCUMENTS

| | | |
|---|---|---|
| 8,160,293 B1 | 4/2012 | Fridrich et al. |
| 9,350,984 B2 | 5/2016 | Beck |
| 9,532,013 B1 | 12/2016 | McCusker et al. |
| 9,733,349 B1 * | 8/2017 | Wood .................... G01S 13/913 |
| 10,302,450 B1 * | 5/2019 | Doty ...................... G01C 23/00 |
| 10,901,674 B2 * | 1/2021 | True ......................... G06N 3/02 |
| 2006/0013486 A1 | 1/2006 | Burns et al. |
| 2009/0175530 A1 | 7/2009 | Sjostrom et al. |
| 2014/0293072 A1 | 10/2014 | Kim et al. |
| 2018/0052277 A1 | 2/2018 | Schowengerdt et al. |

* cited by examiner

INTEGRITY MONITORING SYSTEMS AND METHODS FOR IMAGE SENSORS

CROSS-REFERENCE TO RELATED APPLICATION

The present application claims priority to U.S. Non-Provisional application Ser. No. 15/882,885 filed Jan. 29, 2018 entitled "INTEGRITY MONITORING SYSTEMS AND METHODS FOR IMAGE SENSORS", which is incorporated herein by reference in their entirety.

BACKGROUND

Embodiments of the inventive concepts disclosed herein relate generally to the field of sensors. Embodiments of the inventive concepts disclosed herein more specifically relate to integrity monitoring of image sensors, such as, cameras used in aviation, autonomous driving and similarly safety-critical environments.

Display systems, such as, head down displays (HDDs) and head up displays (HUDs) systems, provide information that is viewable for the operation of equipment, such as aircraft, ships, boats, naval crafts, medical equipment, robotic equipment, remote vehicles, unmanned vehicle systems ("UVS"), training simulators, entertainment systems, military equipment, land vehicles, etc. The information can include navigation parameters, guidance parameters, equipment parameters, location information, video information, target information, remote views, symbology, etc.

The display systems can be used to display images captured by sensors (e.g., one or more scenes in the environment of the aircraft). The sensors can be visible, ultra-violet, infra-red light cameras or radio-frequency systems. The integrity of the images captured by the cameras is necessary for presenting the user (e.g., pilot) accurate positioning and situational awareness information. The use of less expensive, commercial off the shelf (COTS) optical cameras can compromise overall system integrity. Assurance that image information from the sensors is correctly presented and correctly overlays corresponding symbols on the display is desirable. Similarly, when the sensed information is to be processed by automated systems, there is equally a need for assurance of accuracy and integrity to enable the automated processing system to perform safety-critical decisions.

SUMMARY

In one aspect, embodiments of the inventive concepts disclosed herein are directed to an integrity monitoring system for a first image sensor. The integrity monitoring system includes an electronic processor configured to receive sensor data for the provision of image data associated with an environment of the first image sensor. The electronic processor is configured to monitor the first image sensor for integrity and is configured to perform at least one of:
  a. determining a presence of an optical feature associated with optics of the first image sensor in the sensor data and comparing a location and shape or other characteristic of the optical feature with an expected location to determine the integrity of the first image sensor;
  b. comparing overlap information derived from the sensor data and from a second image sensor to determine the integrity of the first image sensor, or both image sensors;
  c. comparing characteristics of a digital output stream of the sensor data to expected characteristics to determine the integrity of the first image sensor; or
  d. comparing a first motion derived from the image data and a second motion derived from avionic position equipment to determine the integrity of the first image sensor.

In a further aspect, embodiments of the inventive concepts disclosed herein are directed to a method of monitoring integrity of an image provided on an avionic display. The method includes receiving image data for the aviation display from a first sensor, and processing the image data with an electronic processor to assess the integrity. The electronic processor performs at least one of:
  a. determining a presence and/or shape or other characteristics of an optical feature associated with optics of the first sensor in the image data and comparing the features of interest of the optical feature with an expected feature of interest to determine the integrity;
  b. comparing overlap information derived from the image data and from a second sensor to determine the integrity;
  c. comparing characteristics of a digital output stream to expected characteristics to determine the integrity; or
  d. comparing a first motion derived from the image data and a second motion derived from avionic position equipment to determine the integrity.

In a further aspect, embodiments of the inventive concepts disclosed herein are directed to a flight control center. The flight control center includes an image sensor configured to provide sensor data associated with an image, and an electronic processor. The electronic processor is configured to receive sensor data and monitor the image sensor for an error. The electronic processor is configured to perform at least one of:
  a. determining a presence of an optical feature associated with optics of the image sensor in the sensor data and comparing a location or shape of the optical feature with an expected location to determine a presence of the error;
  b. comparing overlap information derived from the sensor data and from a second image sensor to determine the presence of the error;
  c. comparing characteristics of a digital output stream associated with the sensor data to expected characteristics to determine the presence of the error; or
  d. comparing first motion data from the image data and second motion data from avionic position equipment to determine the presence of the error.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
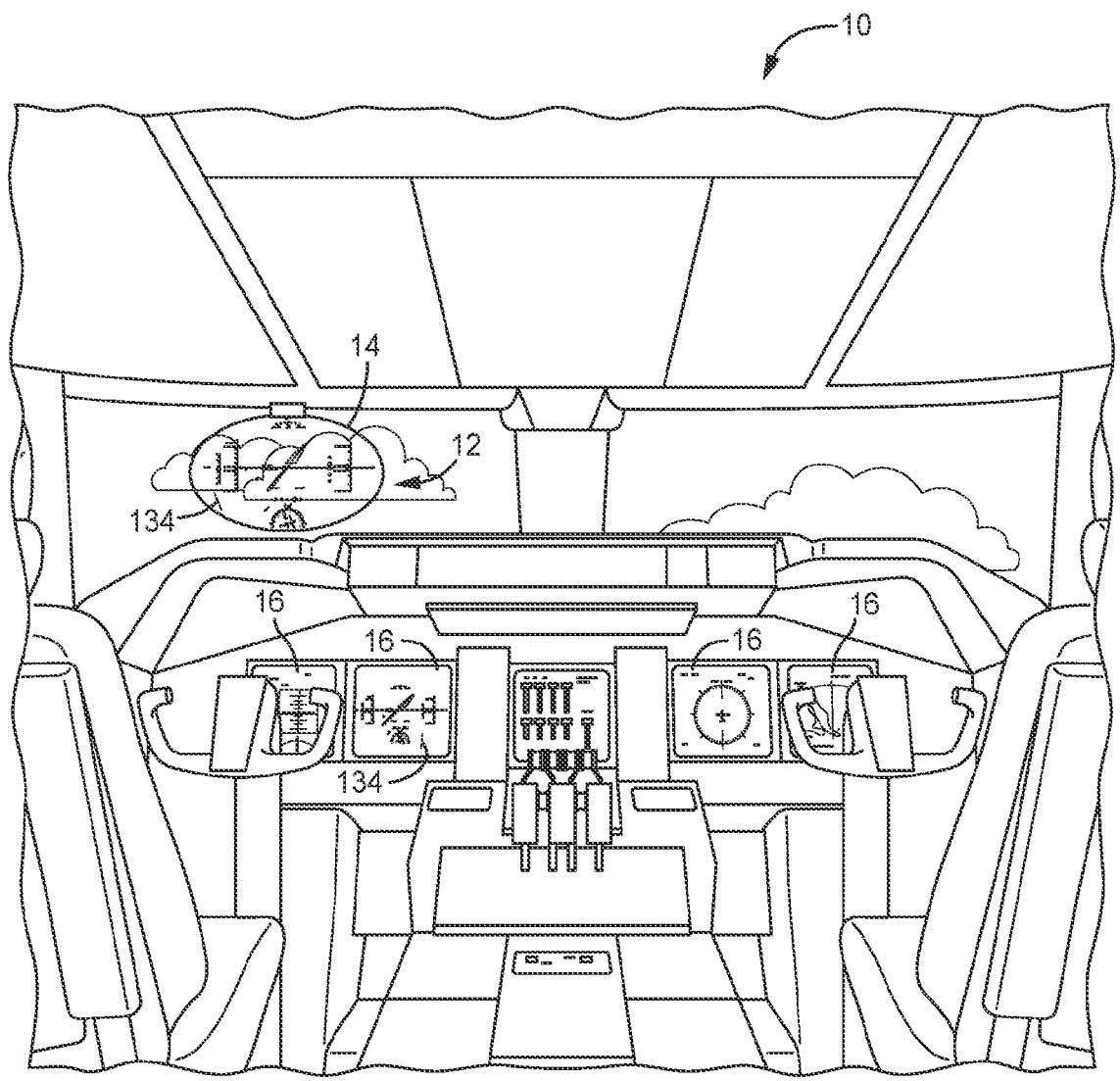
FIG. 1 is a schematic illustration of an aircraft control center in accordance with inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B is true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Display systems such as HUD systems (e.g., helmet mounted displays (HMDs), head worn displays, fixed HUDs, etc.) and HDD systems can present images captured by sensors (e.g., avionic sensors). Accuracy of the images captured by the sensors is important for its appropriate display on the HUD and/or HDD. For example, pixel errors, timing errors, and shift errors adversely affect the image quality. Systems and methods according to the inventive concepts disclosed herein are configured to detect errors or integrity in sensor images for display on HUDs and HDDs so that lower cost, commercial off the shelf (COTS) sensors can be used in high integrity display systems, such as, avionic display systems.

Systems and methods according to the inventive concepts disclosed herein are configured to detect the integrity or errors in a sensor image due to operation of the sensor's optics or electronics. The systems and methods can detect errors or integrity of the sensor by:

1. determining a presence of an optical feature associated with optics of the image sensor in the sensor data and comparing a location or shape or other distinguishing characteristic of the optical feature with an expected location, shape or other distinguishing characteristic to determine a presence of the error;
2. comparing overlap information derived from the sensor data and from a second image sensor to determine the presence of the error;
3. comparing characteristics of a digital output stream associated with the sensor data to expected characteristics to determine the presence of the error; or
4. comparing first motion data from the image data and second motion data from avionic position equipment to determine the presence of the error.

The systems and methods can employ all or a combination of the techniques listed above to detect errors or ensure integrity in some embodiments. In some embodiments, the systems and methods blank the display on the combiner or remove the sensor image in response to a detected error, thereby preventing the user from potentially being provided misleading information.

Referring now to FIG. 1, an illustration of an aircraft control center 10 or cockpit is shown, according to some embodiments. The aircraft control center 10 includes a HUD 12 with a combiner 14 and HDDs 16. Although shown as a fixed HUD 12, the HUD 12 can be an HMD system, an eyewear mounted display system, an HWD system, a near eye display system or other worn display device.

The HUD 12 and the HDDs 16 can be used to provide information to the flight crew, thereby increasing visual range and enhancing decision-making abilities. In some embodiments, the HUD 12 provides HUD symbology, a weather display, a joint display, a weather radar map, a terrain display, images from a synthetic vision system (SVS), and images from an aircraft sensor (e.g., enhanced vision system (EVS) or an enhanced flight vision system EFVS)). The HDDs 16 can also provide images from the EVS or EFVS. The HUD 12 and HDDs 16 can be utilized in various applications including but not limited to aviation, medical, naval, targeting, ground-based vehicle, military, remote control, etc. In some embodiments, HUD 12 is used in a cockpit, bridge, operating room, etc. In some embodiments, the HUD 12 is a monochrome system or a two-color system or a multicolor system.

In some embodiments, the combiner 14 is provided as part of a wearable HUD. In some embodiments, the combiner 14 can be a substrate waveguide including diffractive gratings, a reflective combiner or holographic combiner. The combiner 14 is a translucent or transparent combiner for viewing the real world scene through main surfaces of the combiner 14 in some embodiments. The combiner 14 can be any medium for providing an image.

Figure 2:
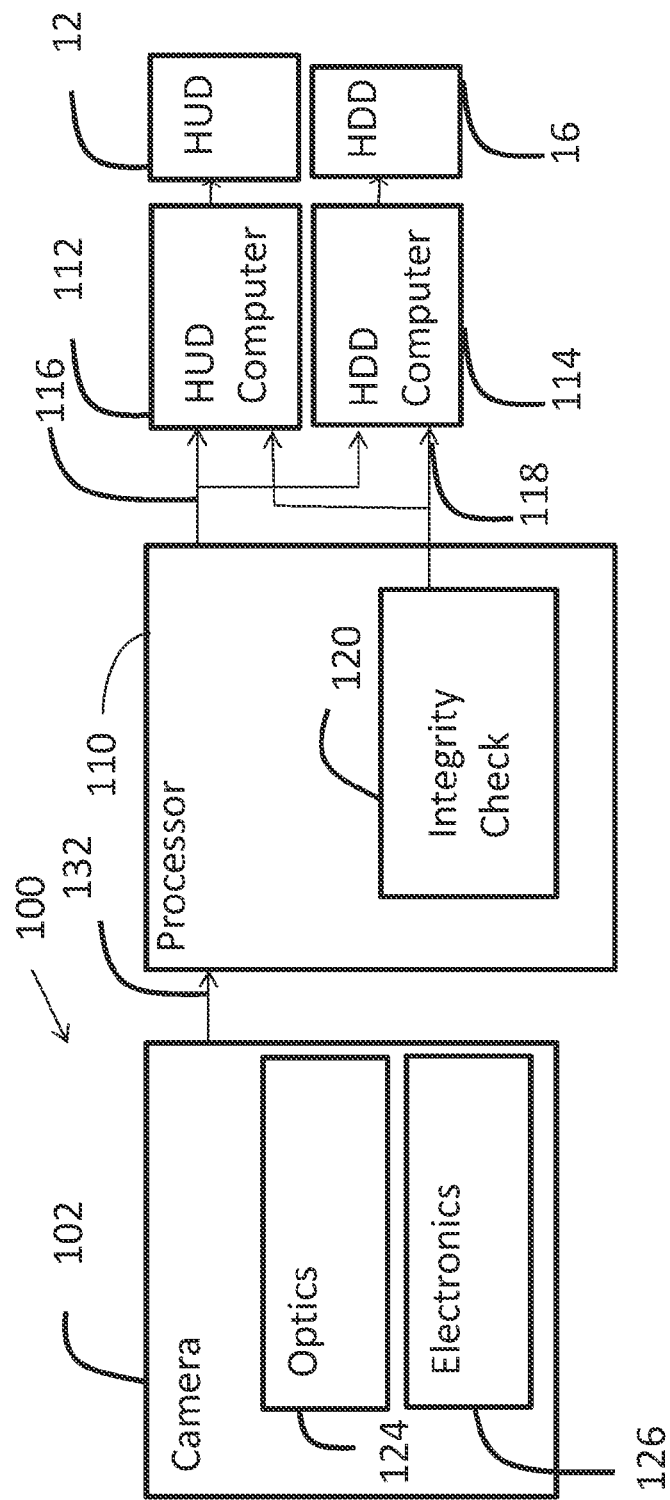
FIG. 2 is a schematic general block diagram of display system including a processor configured for sensor integrity detection for the aircraft control center illustrated in FIG. 1 in accordance with inventive concepts disclosed herein.

With reference to FIG. 2, a display system 100 can be used in the aircraft control center 10 (FIG. 1). The display system 100 includes at least one avionic sensor, such as, a camera 102, and a processor 110 in some embodiments. The display system 100 includes at least one of a HUD computer 112 and at least one HDD computer 114 in some embodiments. The HUD computer 112 and HDD computer 114 operate to provide images on the HUD 12 and the HDDs 16, respectively. In some embodiments, the images include information or video derived from sensor data from the processor 110 provided at an output 116.

The camera 102 is any type of device for converting optical energy into electronic data in some embodiments. The camera 102 is a visible or non-visible light camera having a photosensitive array. In some embodiments, an additional camera similar to the camera captures 102 provides images of the environment. The images from the additional camera can be used to compare with the images captured by the camera 102 in some embodiments. In some embodiments, the multiple cameras provide stitched image having wider field of view than a single camera.

The camera 102 is one or more of an infra-red, ultra-violet, or visible light camera, or a radar with an associated radar antenna and optics. The camera 102 can be a set of cameras, a single camera, or a single camera with multiple sensing arrays for providing two or more sensed images. In some embodiments, the camera 102 is a low cost, COTS camera 102 for providing one or more EVS images. In some embodiments, the camera 102 is a low cost, COTS camera 102 that does not meet the Federal Aviation Administration (FAA) regulatory requirements to ensure integrity.

The camera 102 is a passive or active sensing device (e.g., one or more sensors for an EVS or EFVS) in some embodiments. The camera 102 is a laser scanner, radar system, or other sensor in some embodiments. In some embodiments, the camera 102 includes optics 124, such as, lenses, mirrors, sensor arrays, filters, etc., and electronics 126 for converting the sensed optical information and providing a digital bit stream or frame associated with the captured image. The digital bit stream can be provided according to a pixel clock, a horizontal synchronization clock, and a vertical synchronization clock. The electronics 126 can include software controlled processors and hardware for filtering, amplifying, converting, and modifying the sensed optical information. The electronics 126 provide the sensor data to the processor 110 at an output 132. The electronics 126 can also perform one or more of focus control, brightness control and contrast control of the sensed optical information.

The processor 110 receives the digital bit stream from the output 132 and includes a routine or integrity check monitor 120 for performing integrity or error checks related to the operation of the camera 102. The processor 110 performs routines or operations to ensure that the digital bit stream provided by the optics 124 represents accurately sensed images at the integrity level necessary for avionic application in some embodiments. The processor 110 can also provide image processing on the digital bit stream in some embodiments. For example, the processor 110 can include an image frame memory for storing image frames derived from the digital bit stream provided by the camera 102. The sensor data is processed by the processor 110 for provision at the output 116 in some embodiments.

The processor 110 and the integrity check monitor 120 can be part of or separate from the camera 102, the HDD computer 116, or the HUD computer 112 in some embodiments. In some embodiments, the processor 110 is stand-alone device or is integrated with other avionic equipment. The processor 110 and the integrity check monitor 120 include hardware and software embodied as a module configured to perform operations descried herein and can include software, ASICs, digital signal processors, dedicated circuits, programmable logic, general purpose processors and other electronic equipment in some embodiments. The software can be stored on a non-transitory medium.

The integrity check monitor 120 detects the integrity or errors in a sensor image due to operation of the optics 124 or the electronics 126. In some embodiments, the integrity check monitor 120 of the processor 110 detects errors or assesses integrity of an image by:

1. determining a presence of an optical feature associated with the optics 124 of the camera 102 in the sensor data and comparing a location, presence and/or shape or other characteristics of the optical feature with an expected location to determine a presence of the error;
2. comparing overlap information derived from the sensor data from the camera 102 and from a second camera to determine the presence of the error;
3. comparing characteristics of the digital output stream associated with the electronics 126 to expected characteristics to determine the presence of the error;
4. comparing first motion data from the image data from the camera 102 and second motion data from avionic position equipment to determine the presence of the error; or
5. any combination of the above operations.

The processor 110 provides an indication of an error or of integrity at an output 118. The error or integrity can be related to a pixel or pixel group error, an alignment error such as an image shift error or a rotation error, a timing error, a color or intensity error, a frozen frame, or other misinformation. In some embodiments, the integrity check monitor 120 blanks the combiner 14 (FIG. 1) or HDD 116 or removes the sensor image in response to a detected error at the output 118, thereby preventing the user from potentially being provided misleading information. The indication is provided to the HUD computer 112 or HDD computer 116 in some embodiments so that the image can be blanked or another indication of image error is provided in some embodiments. In some embodiments, the warning is provided in the image data provided at the output 116. In some embodiments, a rating of integrity is provided to the combiner 14, the HDD16, or other display.

In some embodiments, the integrity check monitor 120 of the processor 110 advantageously monitors operation of the camera 102 independently without redesigning access to the optics 124 and the electronics 126 internal to the camera 102 and without requiring software changes internal to the camera 102. The processor 110 can utilize optical features associated with the optics 124, signal analysis of the signal at the output 132 of the camera 102, images from two different sensor arrays or sensing equipment, or motion analysis of the image compared to sensed motion from other equipment to detect the error or integrity independent of integrity processes internal to the camera 102 and independent of the components and build of the camera 102 in some embodiments.

Figure 3:
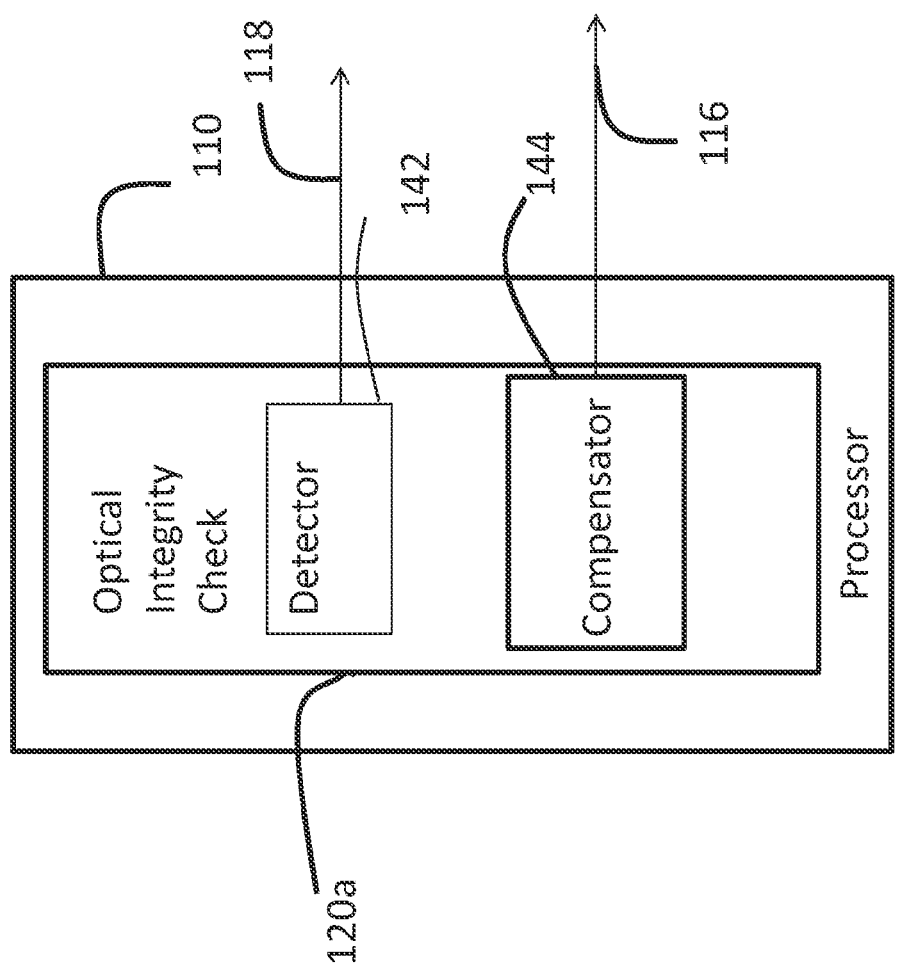
FIG. 3 is a schematic general block diagram of the processor illustrated in FIG. 2 configured for optical-based integrity detection in accordance with inventive concepts disclosed herein.

With reference to FIG. 3, the processor 110 includes an optical integrity check monitor 120a similar to the integrity check monitor 120 to monitor optical features associated with the optics 124 (FIG. 1). The optical features can be features 134 (FIG. 1) provided on windows, lens, mirrors, or other optical components associated with the optics 124 (FIG. 2). The features 134 are one or more optical distortions, such as, scratches, discolorations, opaque matter or other image perturbation. The features 134 may be naturally present perturbation in the optical system, or may be artificially introduced for the purposes described herein. In some embodiments, the features 134 are one or more rain drop shaped material on a component of the optics 124. The rain dropped shaped material can operate as a micro lens and include an embedded LED in some embodiments.

The features 134 are provided in the corners (e.g., upper left) or periphery of the image so that the features 134 are less noticeable in some embodiments. In some embodiments, the features 134 are provided within the sensor field of view but outside of the field of view presented on the HUD 12 or HDDS 16 so that the features 134 are not seen be the user. In some embodiments, the features 134 are one or more light sources, such as light emitting diodes (LEDs) providing light to be sensed at a particular location by the camera 102. The light can be flashed so that the features 134 are only provided on certain frames (e.g., 1 per 60 frames), thereby being less or not noticeable to the user in some embodiments.

The optical integrity check monitor 120a includes a detector 142 and a compensator 144. The detector 142 detects the distortion based upon known characteristics (e.g., shape, size, color, or other distortion characteristic) in the sensor data (e.g., the image stream from the camera 102). The locations of the features 134 are compared to the expected locations to determine if there is an alignment error. An indication of the error is provided at the output 118. In some embodiments, the shapes of the features 134 are compared to the known shapes to determine a pixel or other error. Other characteristics of the features 134 can be compared to known characteristics to determine a presence of an error. Multiple features 134 are used at different locations to provide more complete integrity checks in some embodiments. The known characteristics (e.g., shapes and locations) of the features 134 are determined at device calibration and installation in some embodiments.

In some embodiments, the detector 142 detects the presence of light or similar radiation from the light sources associated with the features 134. The light is identified based upon characteristics such as color, intensity, shape, etc. The presence of the light is also checked to ensure that the light is only present at its prescribed frame to detect timing errors in some embodiments. If the light is present in consecutive frames when the light is supposed to be off, a frozen frame error is detected. The processor 110 can receive timing data indicating when the light is present.

In some embodiments, the compensator 144 can compensate for the features 134 so that the features 134 are not noticed by the user. The compensator 144 provides image processing using neighboring pixels to remove the features 134 from the image. Known characteristics of the features 134 can be used to remove the distortion associated with the features 134. The compensator 144 can also remove any images associated with the features 134 created by a light source, such as, by using pixels from the previous frame at the area where the light is present.

In certain environments (e.g., night or foggy conditions), environmental light may not be sufficient to detect the characteristics of the features 134. In such conditions, an LED or other light can periodically illuminate the environment or the optical element associated with the features 134 so that the features 134 are detectable by the detector 142. The LED is embedded with the optical element of the optics 124 (FIG. 2) that includes the feature 134 in some embodiments.

In some embodiments, when the detector 142 does not detect the features 134, the processor 110 provides a signal to provide illumination in the environment on a periodic basis so that the features 134 are detectable. If the features 134 are not detectable after the illumination is provided, the presence of an error is detected. The illumination can be provided for a very short period of time (once every 60 periods in a second) and the timing of the detection with respect to expected timing can be used for error detection. In some embodiments, the illumination is non-visible light illumination or single color illumination and those characteristics are used to verify detection of the features 134 by the detector 142.

Figure 4:
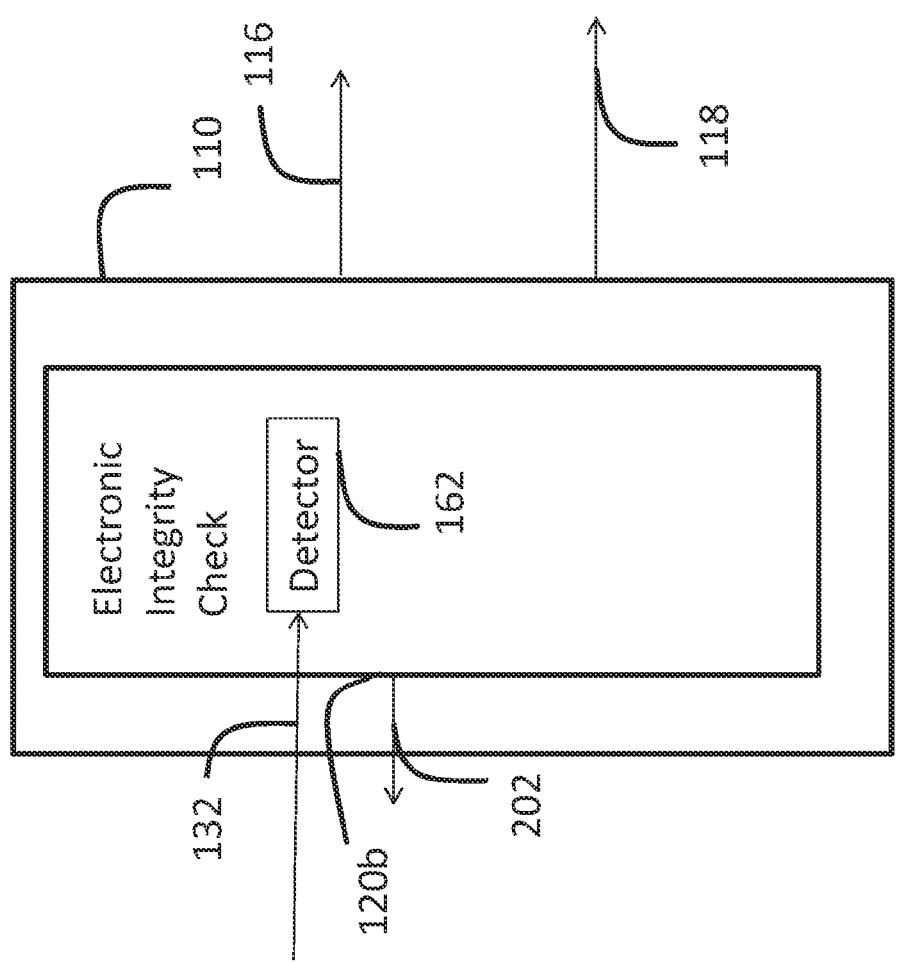
FIG. 4 is a schematic general block diagram of the processor illustrated in FIG. 2 configured for electronic-based integrity detection in accordance with inventive concepts disclosed herein.

With reference to FIG. 4, the processor 110 includes an electronic integrity check monitor 120b similar to the integrity check monitor 120 (FIG. 2) to monitor electronic signals provided the electronics 126 (FIG. 2). The electronic signals are a digital bit stream in some embodiments. The electronic signals are high speed signals from the camera 102 and include a pixel clock, a horizontal synchronization clock, and a vertical synchronization clock that have known parameters (e.g. frequencies) and relationships to each other in some embodiments.

In some embodiments, the electronic integrity check monitor 120b includes a detector 162. The detector 162 receives the electronic signals from the camera 102 at an output 132 and analyzes the signals to detect errors and provide an indication of the error at the output 118. The errors can be detected by comparing to known characteristics, such as, timing characteristics associated with the pixel clock, the synchronization clock, and the vertical synchronization clock and relationships to each other. The relationships can be number of pixels per row, and number of rows per frame in some embodiments. An incorrect number of pixels or rows is an indication of an error.

In some embodiments, the detector 162 can detect known values provided in the digital stream provided with every image. Alternatively, sensor input values can be provided from an output 202 to the camera 102 so that a known set of values can be received at the output 202. In some embodiments, known cyclic redundancy check (CRC) values can be checked base upon known input values.

In some embodiments, a light source such as an LED is placed at the input of the camera 102. The light is pulsed and the camera 102 provides an output signal corresponding to the pulse of light (e.g., a pattern of light pulsed at a frequency or a series of patterns provided over time). The output signal is provided by the camera 102 at the output 132 is analyzed for the known response to the pulse of light by the detector 162. If the response is not appropriate or does not correspond to the timing of the light pulse, the detector 162 provides an indication of the error at the output 118. In some embodiments, the light source provides an optical pattern or series of patterns that is associated with a known response. The pattern is a spatial pattern of colors or wavelengths or a single wavelength in some embodiments.

In some embodiments, the detector 162 injects a low frequency signal into the electronics 136 of the camera 102 via the output 202 and the signal at the output 132 of the camera 102 is analyzed for the appropriate output signal associated with the injected signal. In some embodiments, the injected signal is a carrier signal on the pixel clock signal. In some embodiments, the signal is introduced into an upstream portion of the electronics 126 and the signal at the output 132 is analyzed for the expected transformation of the signal in some embodiments.

In some embodiments, the injected signal is a digital watermark or fingerprint and the signal at the output 132 is analyzed to quantify the effect of the processing chain of the electronics 126 on the watermark or fingerprint. In some embodiments, the processed watermarks or fingerprints is detected and analyzed to detect the errors. In some embodiments, the processed watermark or fingerprint is removed or compensated for so the user does not perceive it in the image. In some embodiments, the watermarks or finger prints are spread across the detected image. In some embodiments, the fingerprints or watermarks are versatile, robust to disruption of small or large portions of the data stream from the camera 102.

Figure 5:
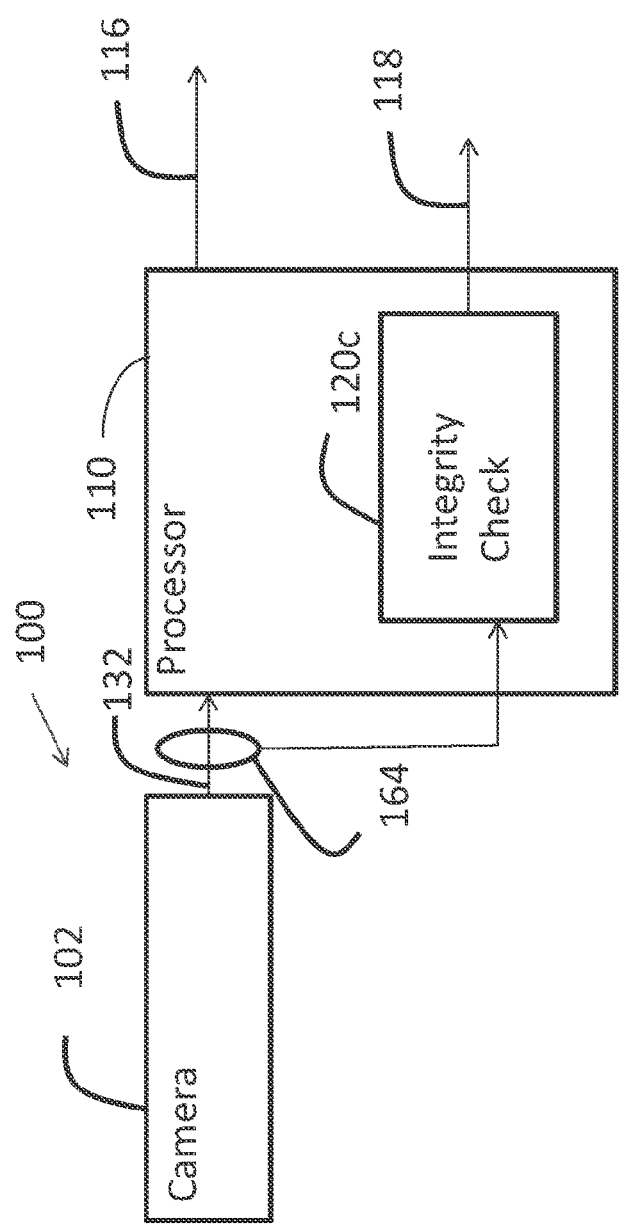
FIG. 5 is a schematic general block diagram of the processor illustrated in FIG. 2 configured for electronic-based integrity detection in accordance with inventive concepts disclosed herein.

With reference to FIG. 5, the display system 10 includes the processor 110 which includes an electronic integrity check monitor 120c similar to the integrity check monitor 120 (FIG. 2) to monitor electronic signals provided the electronics 126. The electronic signals are a high speed digital bit stream and are captured by a circuit 164 in some embodiments. The circuit 164 is an inductive coupling circuit that can be provided around a conductor or conductors associated with the output 132 of the camera 102 in some embodiments. The electronic integrity check monitor 120c sniffs the electric signal at the output 132 to confirm that the data includes values that are expected and that arrive at the right time and provide an indication of any error at the output 118. The electric signals include a pixel clock, a horizontal synchronization clock, and a vertical synchronization clock that have known parameters (e.g. frequencies or rates) and relationships to each other in some embodiments. The electronic integrity check monitor 120c can use any of the techniques discussed above with respect to the electronic integrity check monitor 120b (FIG. 4) in some embodiments.

Figure 6:
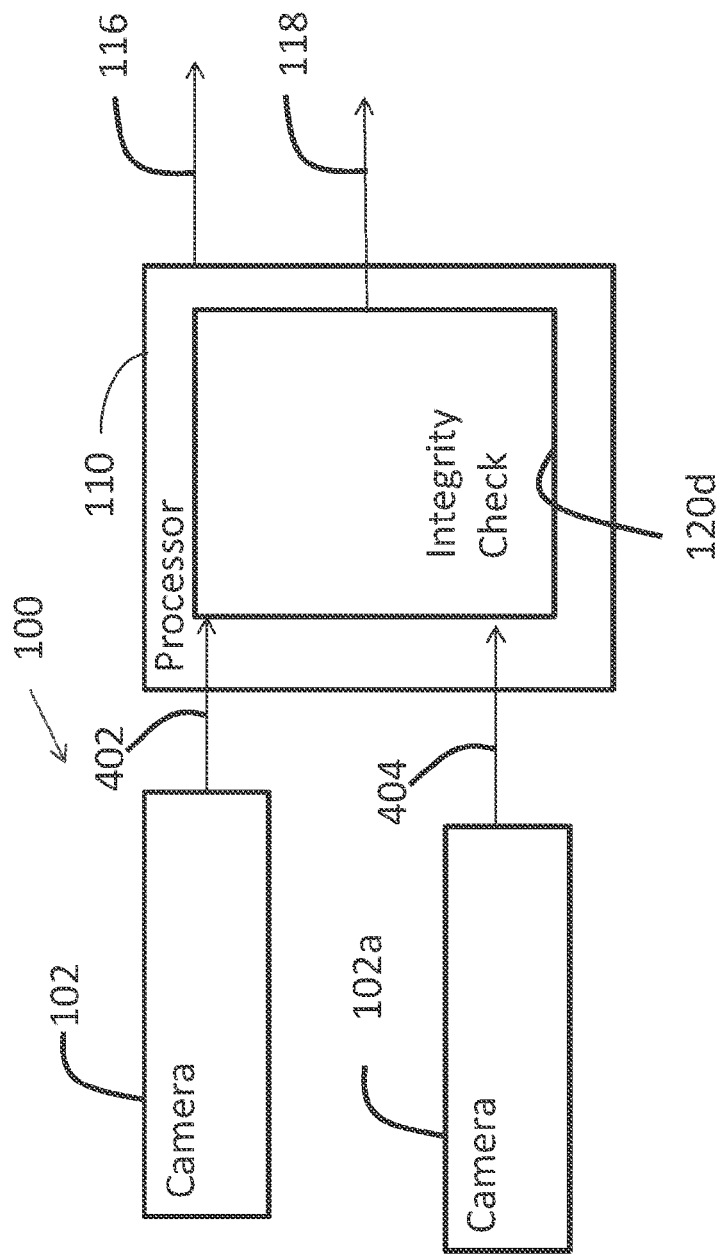
FIG. 6 is a schematic general block diagram of the processor illustrated in FIG. 2 configured for image overlap-based integrity detection in accordance with inventive concepts disclosed herein.

With reference to FIG. 6, the display system 100 includes an integrity check monitor 120d and an additional camera 102a. The integrity check monitor 120d is similar to the integrity check monitor 120 (FIG. 1). The integrity check monitor 120d receives electronic signals representing images captured by the cameras 102 and 102a at outputs 402 and 404. The cameras 102a is similar to the camera 102 and has an overlapping field of view with the camera 102. The overlapping regions can be at edges of each camera's field of view.

The integrity check monitor 120d compares the data associated with the overlapping fields of view and determines if there is any difference between the overlap region captured by the camera 102 and the overlapped region captured by the camera 102a. If a difference exists, an indication of an error is provided at the output 118. The error can be due to a frozen image, shifted image, all white/bright images, or other misleading information.

In some embodiments, the display system 100 includes three or more cameras with overlapped portions. The cameras 102 and 102a can be part of a system that stitches together two or more images for a wide field of view. In some embodiments, the cameras 102 and 102a are the same type of camera (e.g., both are visible cameras or infra-red cameras) or are different types of cameras from each other.

Figure 7:
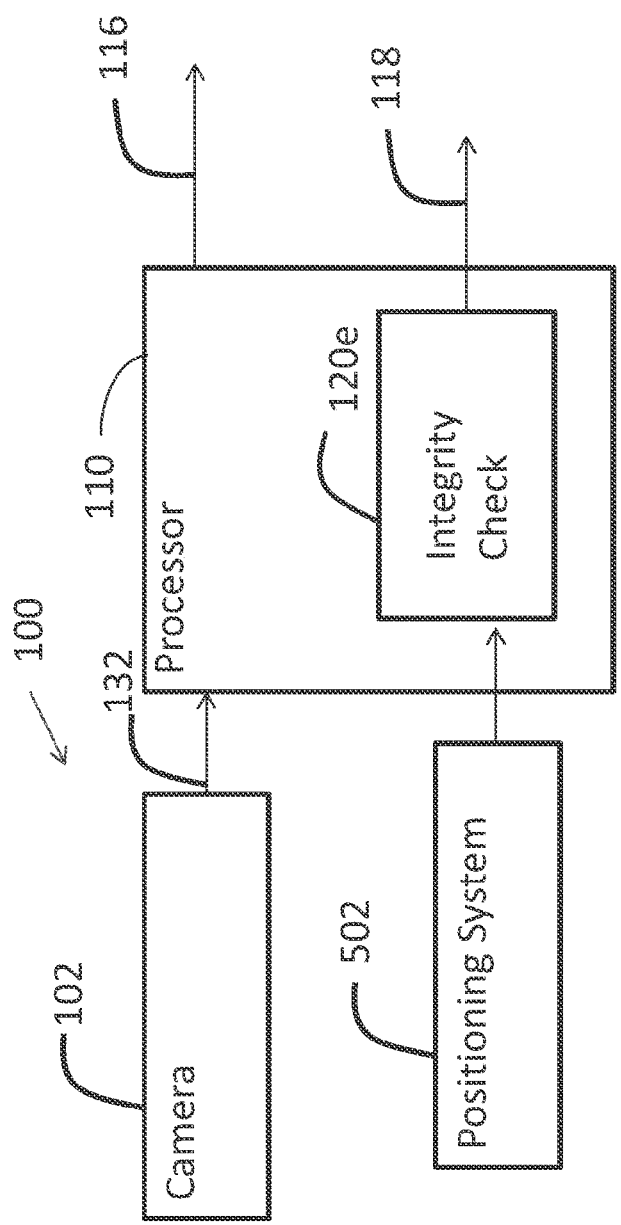
FIG. 7 is a schematic general block diagram of the processor illustrated in FIG. 2 configured for position-based integrity detection in accordance with inventive concepts disclosed herein.

With reference to FIG. 7, the display system 100 includes the processor 110 including an integrity check monitor 120e. The integrity check monitor 120e is similar to integrity check monitor 120 (FIG. 1). The integrity check monitor 120e receives electronic signals representing images captured by the camera 102 and positioning information from a positioning system 502. The positioning system 502 is an inertial navigation system (INS), an attitude and heading reference system (AHRS), a global positioning system (GPS) receiver, or other device or combination of devices for determining a position or motion.

The integrity check monitor 120e compares position or motion information as determined from the images provided by the camera 102 and the position or motion information as provided by positioning system 502 to determine if the positions or motions match. If the positions or motions do not match, the integrity check monitor 120e provides an indication at the output 118 that there is an error in the image from the camera 102 or in the position or motion as determined by the positioning system 502. The position or motion can be a relative position based upon changes over time. For example, the position information can be a flight path vector in some embodiments.

Figure 8:
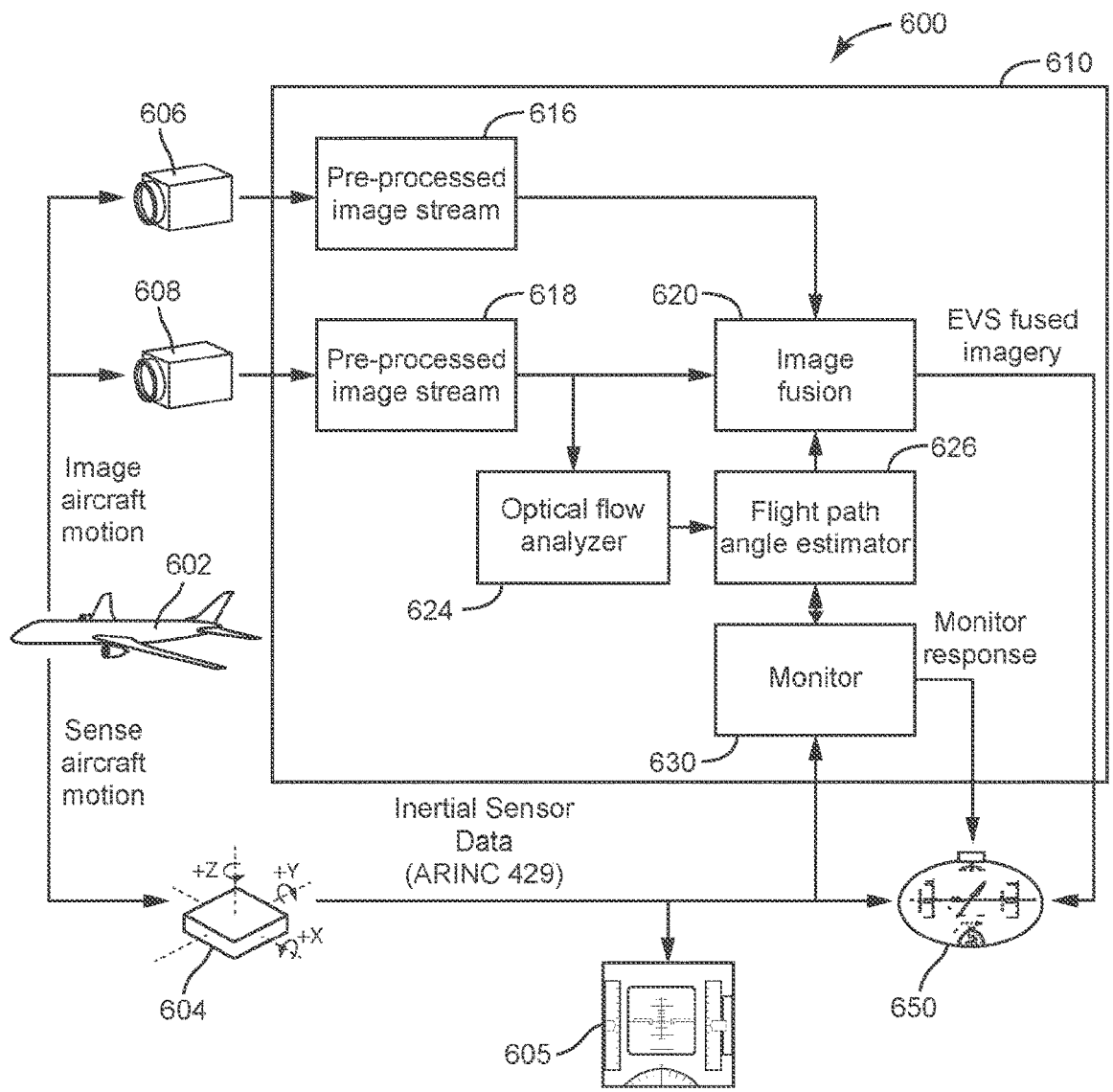
FIG. 8 is a schematic diagram of a display system for an aircraft including a processor configured for positon-based integrity detection in accordance with inventive concepts disclosed herein.

With reference to FIG. 8, a display system 600 similar to the display system 100 (FIG. 1) includes a camera 606, camera 608, and a processor 610. Cameras 606 and 608 are similar to the camera 102 (FIG. 1) and the processor 610 is similar to the processor 110 (FIG. 2). The display system 600 can be employed on an aircraft 602. The processor 610 can be similar to the processor 110 including the integrity check monitor 120e discussed with reference to FIG. 7.

The processor 610 receives electronic signals representing preprocessed image streams 616 and 618 from cameras 606 and 608, respectively. The images from the cameras 606 and 608 are provided to an image fusion module 620 for providing a fused image such as an EVS fused image to a combiner 650 associated with a HUD system such as HUD 12. Alternatively, each image from each camera or radar could be used separately. The preprocessed image stream 618 is provided to an optical flow analyzer 624. The optical flow analyzer 624 processes the preprocessed image stream 618 so that a flight path angle estimator 626 can estimate a flight path angle from the optical flow provided by optical flow analyzer 624.

A monitor 630 compares the flight path angle as determined from flight path angle estimator 626 and from inertial sensor data or GPS data provided by a positioning system 604 in some embodiments. The processor 610 serves to detect motion from the preprocessed image stream 618 and compares such motion against inertially derived motion. The motion can be associated with the aircraft 602 and can include velocity and/or acceleration parameters. The optical flow analyzer 624, flight path estimator 624, and monitor 630 include hardware and software embodied as a module configured to perform operations descried herein and can include software, ASICs, digital signal processors, dedicated circuits, programmable logic, general purpose processors and other electronic equipment in some embodiments. The software can be stored on a non-transitory medium.

The positioning system 604 can be similar to the positioning system 502 (FIG. 7). The positioning information can also be provided to a screen 660, such as a screen for an HDD 16 (FIG. 1). The positioning information can also be provided for display on the combiner 650. The monitor 630 provides an indication if the flight path angle comparison indicates an error. The flight path vector from the flight path estimator 626 or from the positioning system 604 can be provided to the image fusion module 620 in some embodiments.

In some embodiments, the analyzer 624 receives the fused image from image fusion module 620 and determines the optical flow from the fused image. In some embodiments, the monitor 630 detects errors within one second. Monitor 630 determines an error exists if more than, for example, a one percent (1%) difference in the flight path angles is determined. In some embodiments, other flight parameters can be compared to image parameters or image change parameters to monitor for an error. For example, aircraft roll vectors can be compared to image roll vectors or aircraft speed can be compared to a frame-to-frame image magnification instead of or in addition to the flight path angle.

In some embodiments, the optical flow analyzer 624 uses core raw imagery to determine the optical flow. Optical flow analyzer 624 utilizes Lucas-Kanade methods, Horn-Schunck methods, Farnebeck methods or other devices to determine motion information from the preprocessed image stream 618. In some embodiments, block matching methods are utilized for optical flow estimation. The analyzer 624 extracts optical flow from image sequences.

Figure 9:
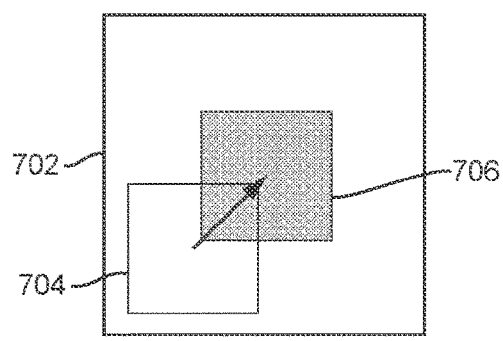
FIG. 9 is a schematic illustration of a block matching technique for positon-based integrity detection using the display system illustrated in FIG. 8 in accordance with inventive concepts disclosed herein.

With reference to FIG. 9, an N by N block in the current frame center is represented by a block 706 and an N by N block in a previous frame is represented by block 704. An average block motion across multiple frames through time can be utilized to determine the flight path vector. Using a math function of mean squared difference, block overlaps of a number of pixels (e.g., 10 pixels) are used to determine motion in a frame of four intervals. Blocks that do not have a good match or are statistical outliers compared to neighboring blocks or image total optical flow can be excluded. In some embodiments, extra fields of view can be used to monitor edge blocks. The block matching can be achieved by finding a position within search space which minimizes the means-square-error of each block.

In some embodiments, the flight path vector can be chosen as the point in the image from which all motion appears to emanate. Such a point generally has zero motion is pointed to or away from by the remainder of the motion vectors and has the best agreement with the remainder of motion vectors. In some embodiments, the flight path vector is the point in the image where all motion vectors intersect and a sum distance is calculated to each motion vector. The point in the field with small sum distance is the flight path vector position.

The flight path vector derived from optical flow works well with planar surfaces and with on-image movement near the bore site. Lower visibility in the environment may require additional tuning modes in some embodiments. In some embodiments, the flight path vector provided by the estimator 622 is utilized to cross-compare EVS and SVS flight path vectors or is used to validate SVS on SVS glide slope approaches. In some embodiments, the data from the positioning system 604 is provided as ARINC 429 data. The optical flow analyzer 624 can compensate motion vectors for altitude changes, provide low visibility tuning, can preprocess to limit actual de-noising and optical distortion correction, and inspect block-contact metrics with macro block match quality for alerting.

While the detailed drawings, specific examples, detailed algorithms and particular configurations given describe preferred and exemplary embodiments, they serve the purpose of illustration only. The inventive concepts disclosed are not limited to the specific forms and reticles shown. For example, the methods may be performed in any of a variety of sequence of steps. The hardware and optical configurations shown and described may differ depending on the chosen performance characteristics and physical characteristics of the image system and processing devices. For example, the type of system components and their interconnections may differ. The systems and methods depicted and described are not limited to the precise details and conditions disclosed. The flow charts show preferred exemplary operations only. The specific mechanical components and operations are shown in a non-limiting fashion. Furthermore, other substitutions, modifications, changes, and omissions may be made in the design, operating conditions, and arrangement of the embodiments.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An integrity monitoring system, comprised of:
   optics having at least one optical feature;
   a first image sensor for producing first sensor data;
   a second image sensor for producing second senor data; and
   an electronic processor configured to receive said first and second sensor data as a digital stream and to:
   a. compare the presence of an optical feature associated with the optics of the first image sensor in said sensor data and comparing the location or shape of the optical feature with the expected location to determine the integrity of the first image sensor;
   b. compare overlap information derived from the sensor data and from said second image sensor to determine the integrity of the first image sensor; and
   c. compare the characteristics of said digital stream of the sensor data to the expected characteristics to determine the integrity of the first image sensor.

2. The integrity monitoring system of claim 1, further comprising avionic position equipment for determining a second motion, wherein said electronic processor compares a first motion derived from image data and the second motion derived from the avionic position equipment to determine the integrity of the first image sensor.

3. The integrity monitoring system of claim 1, wherein the second image sensor is an infrared camera and the first image sensor is a visible light camera.

4. The integrity monitoring system of claim 2, wherein the electronic processor is configured to compare the first motion derived from the image data and the second motion derived from the avionic position equipment to determine the integrity of the first image sensor, and the first motion is a flight path vector.

5. The integrity monitoring system of claim 2, wherein the electronic processor is configured to compare the first motion derived from the image data and the second motion derived from the avionic position equipment after the image data is fused with data from the second image sensor.

6. The integrity monitoring system of claim 2, wherein the electronic processor compares the first motion derived from the image data and the second motion derived from avionic position equipment to determine the integrity and the avionic position equipment comprises an inertial reference system or a global positioning system receiver.

7. The integrity monitoring system of claim 2, wherein an image is provided on an avionic display by displaying the image data received from the first image sensor.

8. The integrity monitoring system of claim 7, wherein the display is a head worn display (HWD), fixed heads up display (HUD), near eye display, a glass frame worn display, or a helmet mounted display (HMD).

9. The integrity monitoring system of claim 2, wherein the electronic processor compares the first motion derived from the image data and the second motion derived from the avionic position equipment to determine the integrity, wherein the first motion is determined utilizing an image flow technique.

10. The integrity monitoring system of claim 2, wherein the electronic processor uses a block flow estimation to determine a flight path angle to compare to a flight path angle from the position equipment.

11. The integrity monitoring system of claim 2, wherein the electronic processor compares the first motion derived from the image data and the second motion derived from the avionic position equipment to determine the integrity, wherein the first motion is determined after de-noising the image data and a flight path vector is determined.

12. The integrity monitoring system of claim 1, wherein a sensor is inductively coupled to the first image sensor to detect a digital output stream, and wherein the electronic processor compares the characteristics of the digital output stream of the sensor data to expected characteristics to determine the integrity of the first image sensor.

13. The integrity monitoring system of claim 1, wherein the electronic processor is configured to perform at least two of:
  a. determining the presence of the optical feature associated with the optics of the first image sensor in the sensor data and comparing the location or shape of the optical feature with the expected location to determine the integrity of the first image sensor;
  b. comparing overlap information derived from the sensor data and from a second image sensor to determine the integrity of the first image sensor;
  c. comparing the characteristics of the digital output stream of the sensor data to the expected characteristics to determine the integrity of the first image sensor; and
  d. comparing the first motion derived from the image data and the second motion derived from the avionic position equipment to determine the integrity of the first image sensor.

* * * * *